(12) United States Patent
Grunlan et al.

(10) Patent No.: US 11,859,096 B2
(45) Date of Patent: Jan. 2, 2024

(54) METHOD FOR APPLYING GAS-IMPERMEABLE COATINGS

(71) Applicant: The Texas A&M University System, College Station, TX (US)

(72) Inventors: Jaime C. Grunlan, College Station, TX (US); Merid Haile, San Antonio, TX (US); Ryan Smith, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 17/984,240

(22) Filed: Nov. 10, 2022

(65) Prior Publication Data

US 2023/0068799 A1 Mar. 2, 2023

Related U.S. Application Data

(63) Continuation of application No. 16/338,958, filed as application No. PCT/US2017/057121 on Oct. 18, 2017, now Pat. No. 11,518,903.

(Continued)

(51) Int. Cl.
| | |
|---|---|
| *B05D 1/00* | (2006.01) |
| *B05D 1/18* | (2006.01) |
| *B05D 1/40* | (2006.01) |
| *C09D 133/02* | (2006.01) |
| *C08J 7/04* | (2020.01) |

(Continued)

(52) U.S. Cl.
CPC .............. *C09D 133/02* (2013.01); *B05D 1/00* (2013.01); *B05D 1/18* (2013.01); *B05D 1/40* (2013.01); *C08J 7/048* (2020.01); *C08J 7/0427* (2020.01); *C09D 179/02* (2013.01); *C08J 2367/02* (2013.01); *C08J 2433/02* (2013.01); *C08J 2479/02* (2013.01)

(58) Field of Classification Search
CPC ............... B05D 1/00; B05D 1/18; B05D 1/40
See application file for complete search history.

(56) References Cited

U.S. PATENT DOCUMENTS

| 6,060,410 A | 5/2000 | Gillberg-LaForce et al. |
| 2004/0253463 A1 | 12/2004 | Inui et al. |

(Continued)

FOREIGN PATENT DOCUMENTS

| CN | 1617797 A | 5/2005 |
| CN | 102481597 A | 5/2012 |

(Continued)

OTHER PUBLICATIONS

Copenheaver, Blaine R., International Search Report for PCT/US2017/057121 (dated Dec. 26, 2017) [1 page].

(Continued)

*Primary Examiner* — Dah-Wei D. Yuan
*Assistant Examiner* — Kristen A Dagenais
(74) *Attorney, Agent, or Firm* — Winstead PC

(57) ABSTRACT

A method of applying a gas-impermeable coating includes forming a polyelectrolyte complex suspension. The polyelectrolyte complex suspension is applied to a substrate. The substrate having the polyelectrolyte complex applied thereon is treated. The treating reduces salt content of the polyelectrolyte complex. The treating results in a gas-impermeable coating being formed on the substrate.

19 Claims, 13 Drawing Sheets

MAKING PEC SUSPENSION

COATING WITH SUSPENSION

TREATING THE FILM

Related U.S. Application Data (60) Provisional application No. 62/410,083, filed on Oct. 19, 2016.

(51) Int. Cl.
*C08J 7/048* (2020.01)
*C09D 179/02* (2006.01)

(56) References Cited

U.S. PATENT DOCUMENTS

| | | | |
|---|---|---|---|
| 2012/0148855 A1* | 6/2012 | Cimpeanu | B05D 5/00 427/407.1 |
| 2012/0156389 A1 | 6/2012 | Kotov | |
| 2014/0363689 A1 | 12/2014 | Grunlan et al. | |
| 2015/0086734 A1 | 3/2015 | Pietsch et al. | |
| 2016/0280933 A1* | 9/2016 | Grunlan | D06B 19/0064 |

FOREIGN PATENT DOCUMENTS

| | | |
|---|---|---|
| DE | 10 2010 032780 A1 | 1/2012 |
| EP | 2194095 A1 | 6/2010 |
| JP | 2013-059930 A | 4/2013 |
| WO | WO-2016/088534 A1 | 6/2016 |
| WO | WO-2016/123295 A2 | 8/2016 |
| WO | WO-2017/017146 A1 | 2/2017 |

OTHER PUBLICATIONS

Ball, Vincent, et al., "The Possibility of Obtaining Films by Single Sedimentation of Polyelectrolyte Complexes," Industrial & Engineering Chemistry Research, vol. 52, Jan. 1, 2013, pp. 5691-5699.
Haile, Merid et al.; "Polyelectrolyte Coacervates Deposited as High Gas Barrier Thin Films"; Macromolecular Rapid Communications; vol. 38; 2017; 9 pages.

* cited by examiner

METHOD FOR APPLYING GAS-IMPERMEABLE COATINGS

CROSS-REFERENCE TO RELATED APPLICATIONS

This application is a continuation of U.S. patent application Ser. No. 16/338,958, having a 371(c) date of Apr. 2, 2019, which is a national stage entry of PCT/US2017/057121, filed on Oct. 18, 2017. PCT/US2017/057121 claims priority to U.S. Provisional Patent Application No. 62/410,083, filed on Oct. 19, 2016. Each of the aforementioned applications are incorporated herein by reference in their entirety.

TECHNICAL FIELD

The present application relates generally to coatings and more particularly, but not by way of limitation, to thin gas-impermeable coatings.

BACKGROUND

This section provides background information to facilitate a better understanding of the various aspects of the disclosure. It should be understood that the statements in this section of this document are to be read in this light, and not as admissions of prior art.

Optically transparent, flexible thin films that provide a high oxygen barrier are desirable for applications such as pressurized systems, food packaging, and protection of flexible electronics. Prevailing technologies, such as silicon oxide ("SiOx") and aluminum oxide ("AlxOy") thin films, provide a relatively impermeable layer to oxygen, but tend to have poor adhesion, flexibility, and require costly vacuum-based processing. Multilayer films deposited from water using layer-by-layer (LbL) assembly have shown extraordinarily low oxygen permeability and are of high interest due to their robustness, tailorability and ease of fabrication. Despite all the advantages associated with LbL assembly, the large number of processing steps remains a considerable challenge for commercial use.

SUMMARY

A method of applying a gas-impermeable coating according to aspects of the disclosure includes forming a polyelectrolyte complex suspension and applying the polyelectrolyte complex suspension to a substrate. In some embodiments, the method may include drying the polyelectrolyte complex suspension after application to the substrate. In some embodiments, the method may include curing the polyelectrolyte complex suspension after application to the substrate.

A method of applying a gas-impermeable coating according to aspects of the disclosure includes forming a polyelectrolyte complex suspension, applying the polyelectrolyte complex suspension to a substrate, and treating the substrate having the polyelectrolyte complex applied thereon. The treating reduces salt content of the polyelectrolyte complex and causes solid film formation on the substrate. The treating results in a gas-impermeable coating being formed on the substrate.

This summary is provided to introduce a selection of concepts that are further described below in the detailed description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the method and system of the present disclosure may be obtained by reference to the following Detailed Description when taken in conjunction with the accompanying drawings wherein.

DETAILED DESCRIPTION

Various embodiments will now be described more fully with reference to the accompanying drawings. The disclosure may, however, be embodied in many different forms and should not be construed as limited to the embodiments set forth herein.

Figure 1:
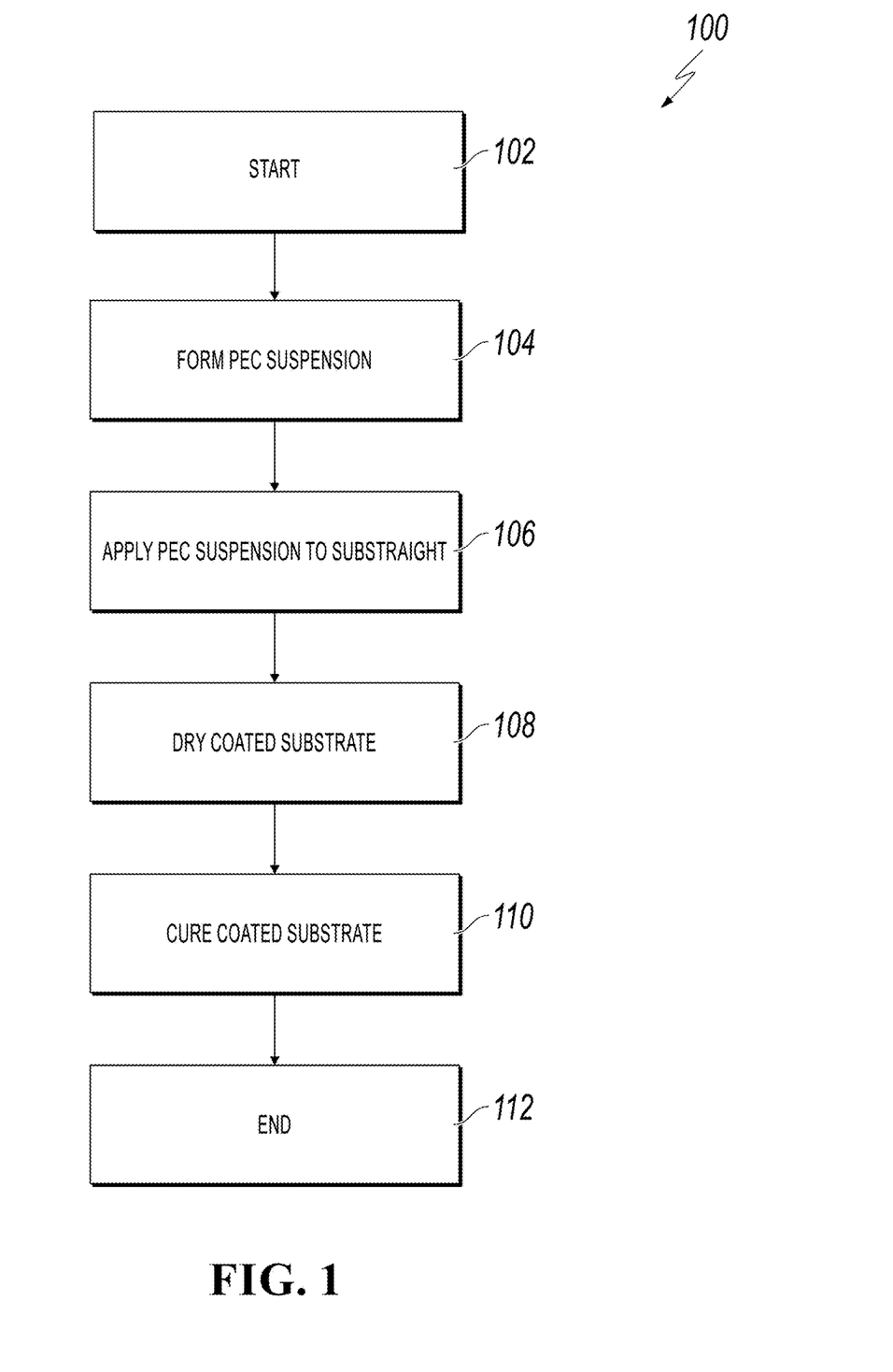
FIG. 1 is a flow diagram illustrating a process for applying a gas impermeable coating according to an exemplary embodiment.
Figure 2A:
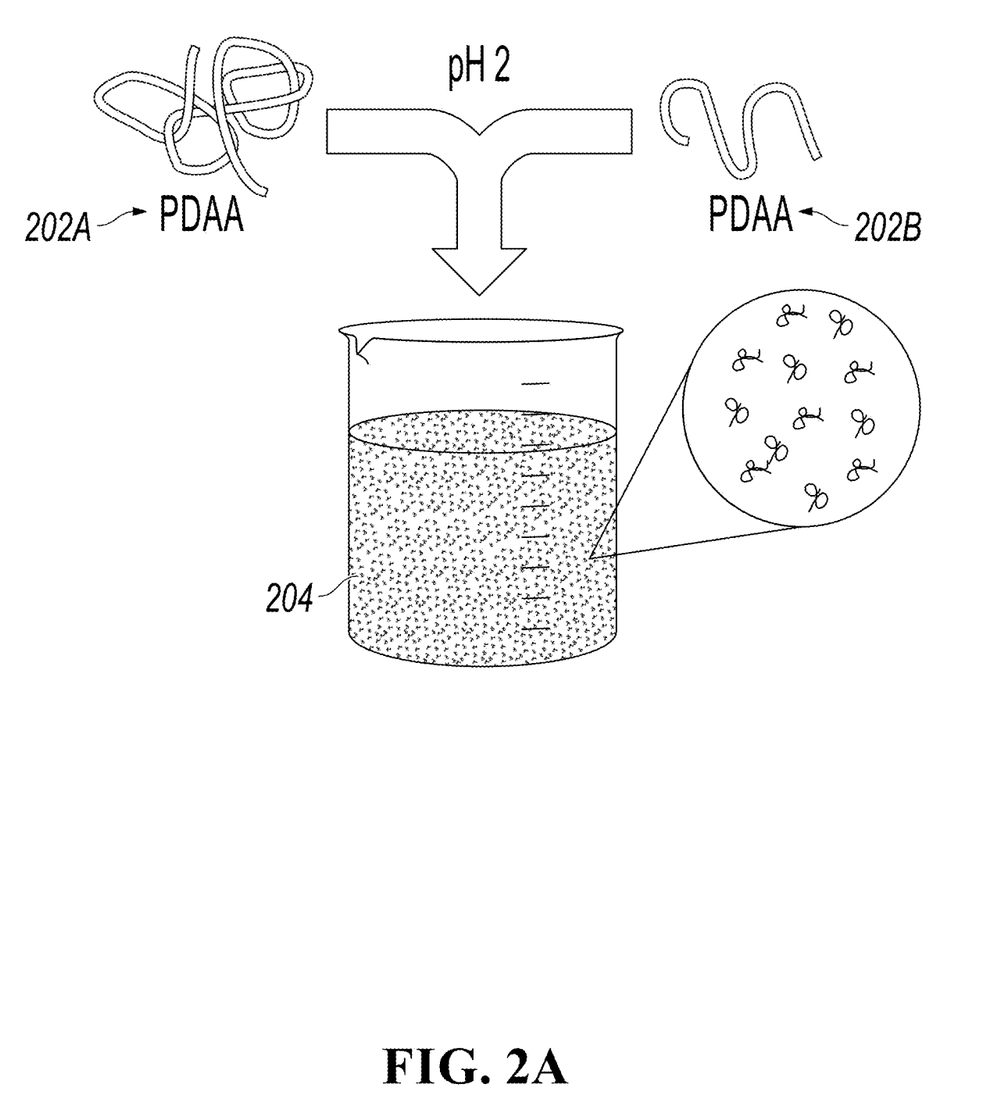
FIG. 2(a) is a diagrammatic illustration of a polyelectrolyte complex suspension according to an exemplary embodiment.
Figure 2B:
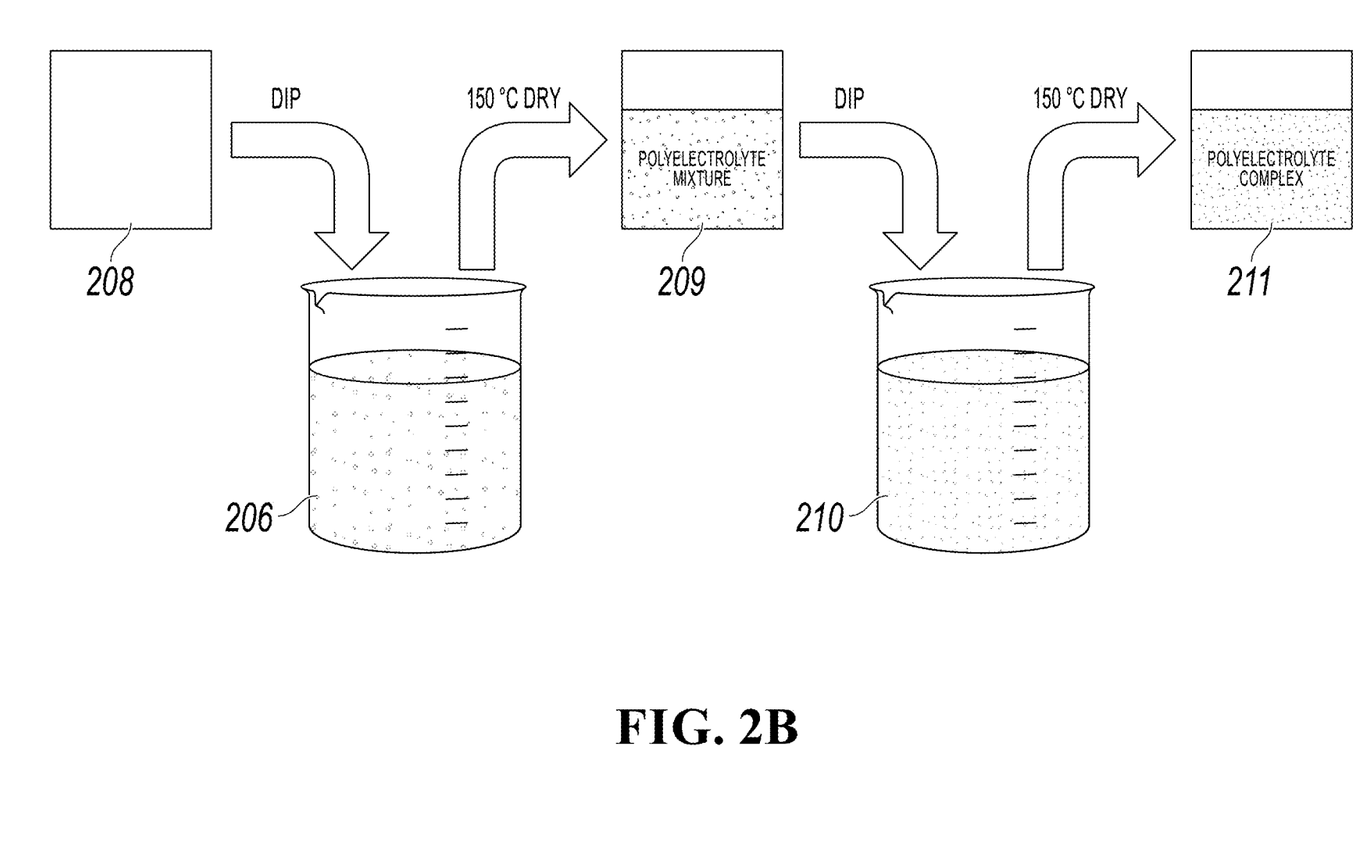
FIG. 2(b) is a diagrammatic illustration of the process illustrated in FIG. 1.

FIG. 1 is a flow diagram of a process 100 for applying a gas impermeable coating. FIG. 2(a) is a diagrammatic illustration of a polyelectrolyte complex. FIG. 2(b) is a diagrammatic illustration of the process 100. Referring to FIGS. 1-2(b) collectively, the process 100 begins at block 102. At block 104, a polyelectrolyte complex (PEC) suspension is formed. PECs are formed by the entropy-driven association of oppositely-charged polyelectrolytes in water and can exist as stable colloids, flocculants, or metastable coacervates. Governed by conditions such as, for example, pH and ionic strength, PEC coacervation is marked by a liquid-liquid phase separation, where a polymer-rich coacervate phase is in equilibrium with a polymer-poor solution phase. PEC coacervates are comprised of weakly bound polyelectrolytes, and have viscous liquid-like behavior that can be exploited to quickly apply them as thin films.

As illustrated in FIG. 2(a), the PEC coacervate complex is comprised of at least two oppositely charged polyelectrolytes (202a and 202b) in water 204. In various embodiments, cationic polydiallyldimethylammonium chloride (PDDA) and anionic polyacrylic acid (PAA), for example, may be used to form the coacervate. Other embodiments may make use of strong polyelectrolytes. Other further embodiments may make use of, for example, Polyethylenimine, Poly(allyl amine), polyethylenimine (PEI), Chitosan, Functionalized starch, Poly(vinyl amine), Poly(vinylbenzyltrimethyl-ammonium) bromide, and Poly(4-vinyl-N-butyl-pyridinium) chloride as a polycation, and Poly(acrylic acid) and sodium polyacrylate, Poly(styrene sulfonic acid) and sodium poly (styrene sulfonate), Carboxymethylcellulose, Alginic acid, Hyaluronic acid, Heparin, and Polyphosphoric acid and Polyphosphate salts as a polyanion. The ionic strengths of the polycation and polyanion are controlled in order to make the polyanion and the polycation suitable for a coating process. The ionic strength is normally manipulated by the addition of salt such as, for example, NaCl. The pH of the PEC is controlled such that the polyelectrolytes dissolve and there is no hydrogen bonding or electrostatic interaction between the polyelectrolytes. In embodiments utilizing a strong polyanion and a weak polycation, the PEC is formed at a pH of, for example, 2. In embodiments utilizing a strong polycation and a weak polyanion, the pH of the PEC is controlled to have a basic (i.e. greater than 7) pH to dissolve the polyelectrolytes. As used herein, the term "strong" (e.g. strong polyelectrolyte, strong polycation, or strong polyanion) refers to a polyelectrolyte that dissolves completely in solution for most pH values. The term "weak" (e.g. weak polyelectrolyte, weak polycation, or weak polyanion) refers to a polyelectrolyte that are not fully charged in solution and are partially dissociated at intermediate pH. The fractional charge of a weak polyelectrolyte can be modified by changing the solution pH, counter-ion concentration, or ionic strength. As used herein, the term "ionic strength" refers to a measure of the concentration of ions in a solution. In various embodiments, regulation of ionic-strength via, for example, addition of salt, could be utilized in lieu of, or in addition to, pH regulation in order to control interaction of the polyelectrolytes. Other embodiments may utilize two weak polyelectrolytes. In embodiments utilizing two weak polyelectrolytes, the polyelectrolytes are controlled utilizing at least one of a low-pH solution, a high-pH solution, and ionic-strength control.

At block 106, the PEC suspension is applied to a substrate such as, for example, polyethylene terephthalate (PET), poly(lactic acid) (PLA), polyurethane (PU), polyethylene (PE), polystyrene (PS). The substrate 208 may be of any thickness as dictated by the particular application. As illustrated in FIG. 2(b), in a typical embodiment, the PEC suspension 206 is applied to the substrate 208 using, for example, a dip process. In other embodiments, however, the PEC suspension could be applied to the substrate using, for example, gravure application, slot-die application, roll-to-roll application, or by use of an instrument such as, for example, a Mayer rod. During application of the PEC suspension 206 to the substrate 208, the thickness of the applied PEC suspension 206 is controlled by viscosity and the presence of dissolved solids.

At block 108, the coated substrate 209 is dried. In a typical embodiment, the coated substrate 208 is dried, for example, for approximately 20 minutes at, for example, approximately 150° C.; however, in other embodiments, other temperatures and drying times could be utilized. Such drying evaporates excess water from the PEC 206 and has been demonstrated to improve optical clarity of the gas-impermeable coating when compared to processes where the drying block 108 is omitted.

At block 110, the coated substrate 209 is immersed in a buffering solution 210. In a typical embodiment, the buffering solution 210 has a pH of a weak acid such as, for example, in the range of 3-5. In various embodiments, the buffering solution 210 may be, for example, acetic acid, citric acid, a phosphate buffer, or a trizma buffer as dictated by the polyelectrolytes used in the PEC 206. In embodiments utilizing a strong polyanion and a weak polycation, a buffering solution 210 having a basic pH is desirable. During block 110, the pH of the buffering solution 210 causes pH-induced ionic bonding in the PEC 206, which results in curing of the PEC 206. In a typical embodiment, utilization of the buffering solution 210 to result in a cured PEC coating 211 results in approximately a 10-fold improvement in gas-impermeability than if the buffering solution 210 were not utilized. In various embodiments, one or both of blocks 108 and 110 may be omitted from the process 100 depending on the needs of the particular application. The process 100 ends at block 112.

Figure 3:
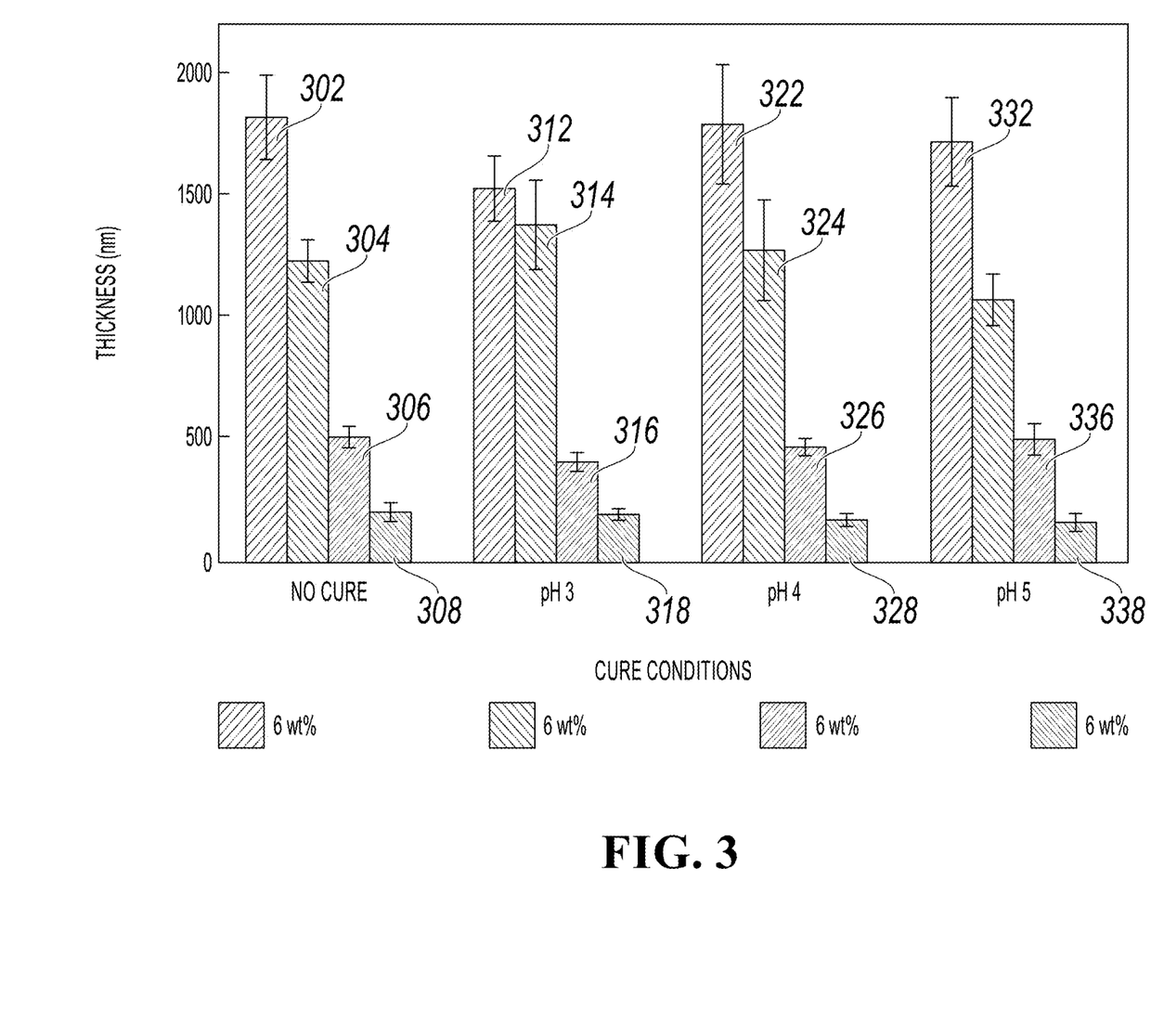
FIG. 3 is a table illustrating coating thickness at various cure conditions according to an exemplary embodiment.

FIG. 3 is a table illustrating thickness of the gas-impermeable coating at various cure conditions. By way of example, the data shown in FIG. 3 utilizes a PEC having a 1:3 molar ratio of cation to anion; however, in various embodiments, other molar ratios could be utilized as dictated by design requirements. As shown in FIG. 3, the presence of a higher weight percentage of solid content in the PEC 206 gives rise to thicker gas impermeable coatings. Group 302 illustrates 6 wt % solid PEC with no cure. Group 304 illustrates 4.5 wt % solid PEC with no cure. Group 306 illustrates 3 wt % solid PEC with no cure. Group 308 illustrates 1.5 wt % solid PEC with no cure. Group 312 illustrates 6 wt % solid PEC utilizing a buffering solution with a pH of 3 for curing. Group 314 illustrates 4.5 wt % solid PEC utilizing a buffering solution with a pH of 3 for curing. Group 316 illustrates 3 wt % solid PEC utilizing a buffering solution with a pH of 3 for curing. Group 318 illustrates 1.5 wt % solid PEC utilizing a buffering solution with a pH of 3 for curing. Group 322 illustrates 6 wt % solid PEC utilizing a buffering solution with a pH of 4 for curing. Group 324 illustrates 4.5 wt % solid PEC utilizing a buffering solution with a pH of 4 for curing. Group 326 illustrates 3 wt % solid PEC utilizing a buffering solution with a pH of 4 for curing. Group 328 illustrates 1.5 wt % solid PEC utilizing a buffering solution with a pH of 4 for curing. Group 332 illustrates 6 wt % solid PEC utilizing a buffering solution with a pH of 5 for curing. Group 334 illustrates 4.5 wt % solid PEC utilizing a buffering solution with a pH of 5 for curing. Group 336 illustrates 3 wt % solid PEC utilizing a buffering solution with a pH of 5 for curing. Group 338 illustrates 1.5 wt % solid PEC utilizing a buffering solution with a pH of 5 for curing.

Figure 4:
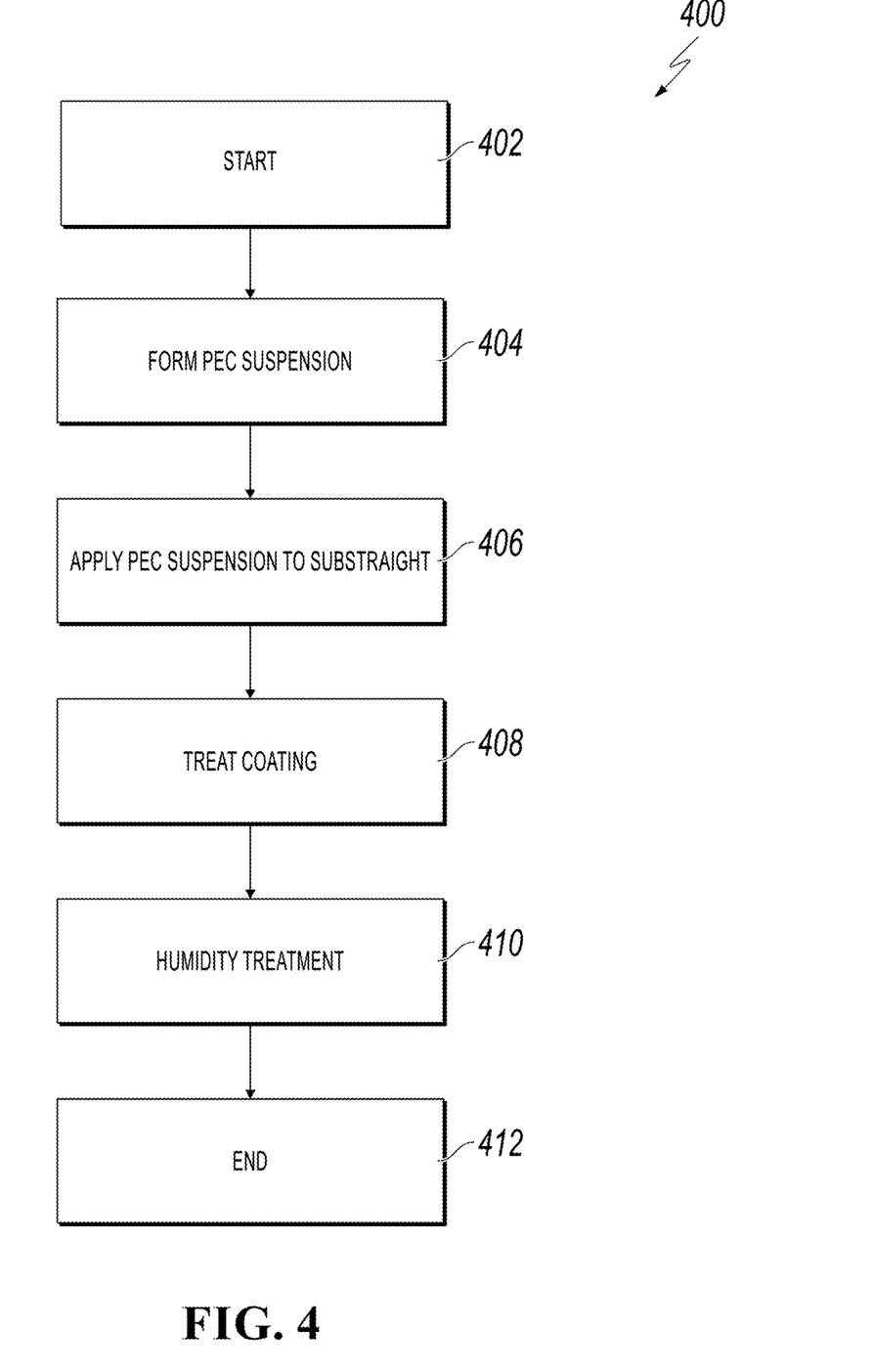
FIG. 4 is a flow diagram illustrating a process for applying a gas impermeable coating according to an exemplary embodiment.
Figure 5:
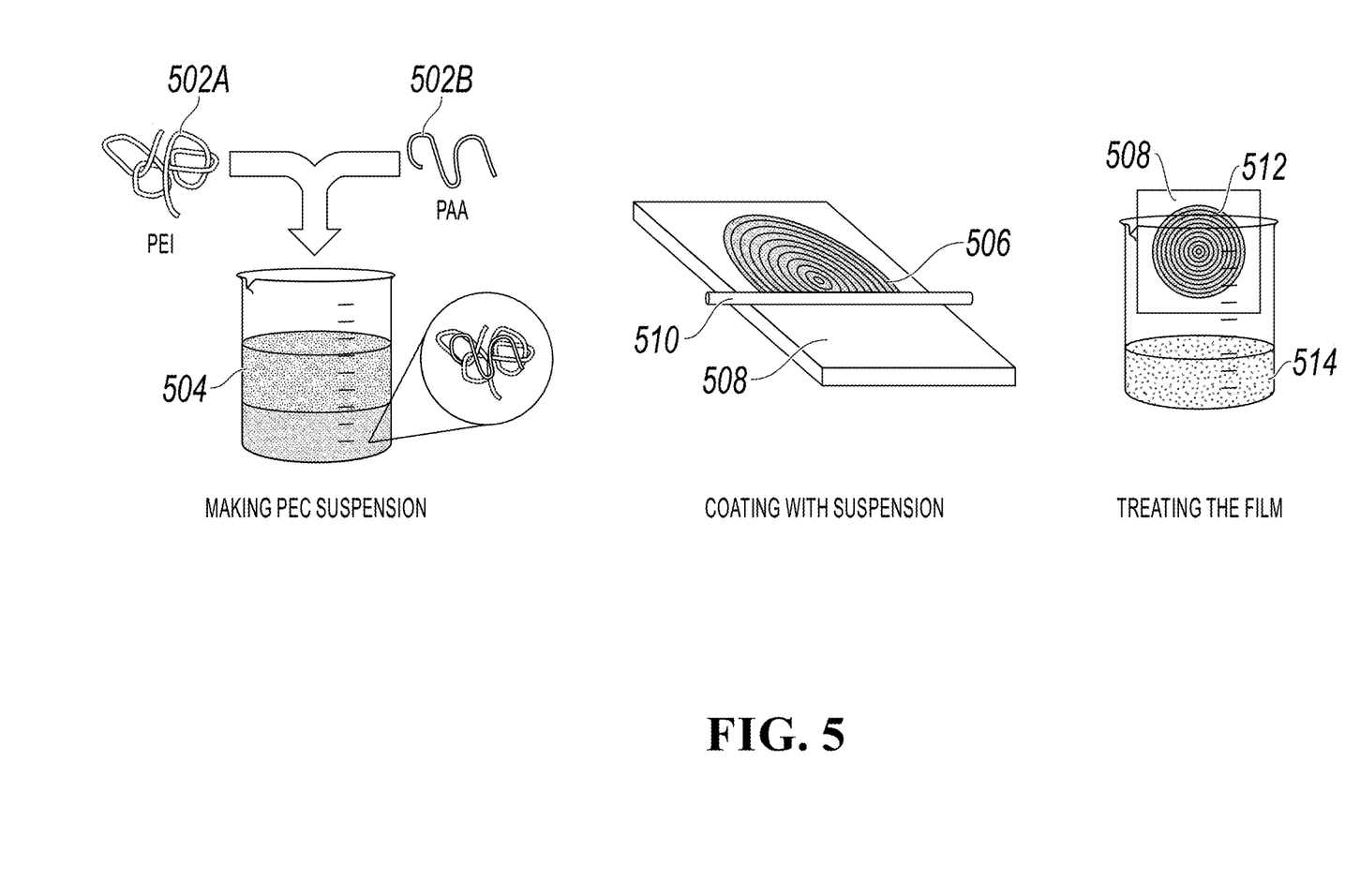
FIG. 5 is a diagrammatic illustration of the process illustrated in FIG. 1.

FIG. 4 is a flow diagram illustrating a process 400 for applying a gas impermeable coating. FIG. 5 is a diagrammatic illustration of the process 400. Referring to FIGS. 4-5 in combination, the process 400 begins at block 402. At block 404, a polyelectrolyte complex (PEC) suspension is formed.

As illustrated in FIG. 5, the PEC coacervate complex is comprised of at least two oppositely charged polyelectrolytes (502a and 502b) in water 504. In various embodiments, cationic polyethylenimine (PEI) and anionic polyacrylic acid (PAA), for example, may be used to form the coacervate. Other embodiments may make use of strong polyelectrolytes. Other further embodiments may make use of Polyethylenimine, Poly(allyl amine), Poly(diallyldimethyl ammonium chloride), Chitosan, Functionalized starch, Poly(vinyl amine), Poly(vinylbenzyltrimethyl-ammonium) bromide, and Poly(4-vinyl-N-butyl-pyridinium) chloride as a polycation, and Poly(acrylic acid) and sodium polyacrylate, Poly(styrene sulfonic acid) and sodium poly(styrene sulfonate), Carboxymethylcellulose, Alginic acid, Hyaluronic acid, Heparin, and Polyphosphoric acid and Polyphosphate salts as a polyanion. The ionic strengths of the polycation and polyanion are controlled in order to make it suitable for a Meyer rod coating process. The ionic strength is normally manipulated by the addition of salt such as, for example, NaCl.

At block 406, the PEC suspension 506 is applied to a substrate. As illustrated in FIG. 5, in a typical embodiment, the PEC suspension 506 is applied to the substrate 508 using, for example, a Meyer rod 510. The Meyer rod 510 is drawn across the substrate, doctoring off coating fluid, using formed or wired grooves to deposit a specific wet-film thickness onto the substrate 508. The PEC suspension 506 used for this process must have sufficient viscosity to resist dewetting and contain enough weight polymer to deposit a uniform layer. In a typical embodiment, NaCl concentration heavily influences the viscosity and maintaining a proper concentration is vital to the coating process. In certain embodiments, the substrate 508 may be corona-treated or plasma treated to increase surface energy. In certain embodiments, a wetting agent, such as, for example, a surfactant, may be added to the PEC suspension 506 to decrease surface tension and achieve more complete wetting of the substrate 508 by the PEC suspension 506.

Figure 6A:
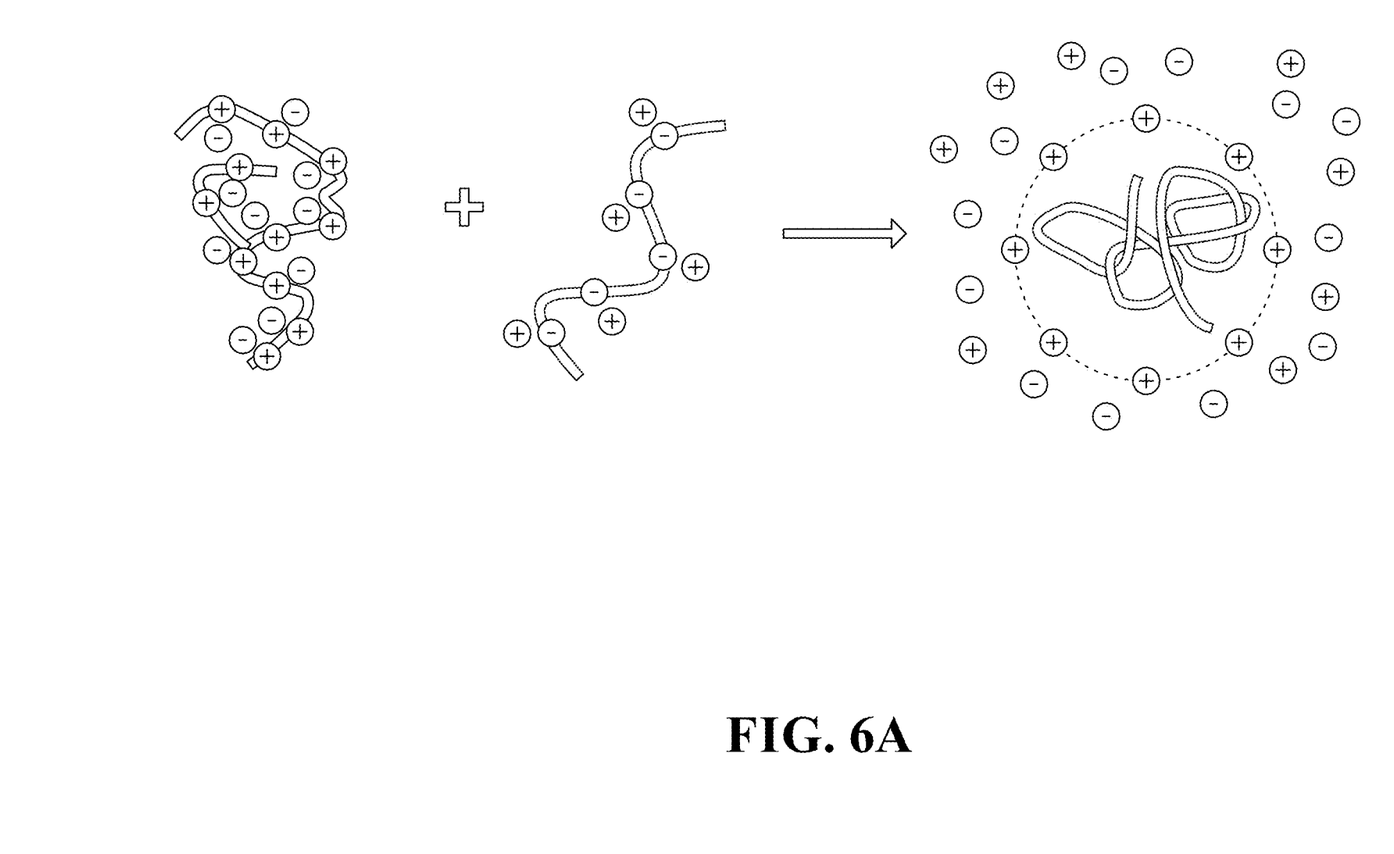
FIG. 6(a) is an illustration of a polycation and polyanion associating to form a polyelectrolyte complex according to an exemplary embodiment.

At block 408, the coating is treated. As illustrated in FIG. 5, once the substrate 508 is coated the film 512 must be treated to allow the applied film to become solid. In a typical embodiment, salt must be driven out from the film 512 to allow the film 512 to solidify. Thus, any solution containing a lower salt concentration should be able to facilitate this process. In certain embodiments, a buffer 514 may also be used such as, for example, a citric acid/citrate buffer aqueous solution, where the buffer improves the film's 512 durability to rinsing and produces higher cohesive energy density, thereby preventing gas molecules from moving aside polymer chains. In some embodiments, and as illustrated in FIG. 5, the treatment may be performed by immersion of the film 512. Various other embodiments may make use of spraying the film or a combination of the immersion and spraying. Additionally, various embodiments may utilize various forms of drying such as air drying, oven drying, or suspension. Various other embodiments, however, may not dry the solid film 512. In a typical embodiment, the resulting film thickness is less than 10 microns. In a typical embodiment, the oxygen transmission rate through the film is less than approximately 10 cm$^3$/(m$^2$ day atm). FIG. 6 provides a graphical illustration of oxygen transmission rate versus pH.

After treatment in block 408, the film 512 is subjected to a high humidity treatment in block 410 in order to remove porosity and uncover fissures. Pores likely arise from fast evaporation of water from the film during air drying and are not present in layer-by-layer assembled films. Water acts as a plasticizer, allowing polymer to fill the coating's pores. In various embodiments, exposure to high humidity such as, for example, greater than approximately 95% relative humidity for approximately 12 hours helps to close pores present in the film 512. In other embodiments, thermal crosslinking chemically bonds the PEI to the PAA to create amide bonds. Thermal crosslinking may be performed by high heat at, for example, approximately 150° C. for approximately 2 hours. Various other embodiments may make use of other types of crosslinking. Some crosslinking may occur, for example, via chemical reaction. In certain embodiments, a crosslinking agent is added to the original PEC suspension and later activated. The final film 512 would be exposed to a crosslinking agent to finish the process. The process 400 ends at block 412.

EXAMPLES

Cationic branched polyethylenimine ($M_w$=25,000 g mol$^{-1}$), anionic polyacrylic acid solution ($M_w$=100,000 g mol$^{-1}$, 35 wt % in water), anhydrous sodium hydroxide pellets (reagent grade, ≥98%), sodium chloride, citric acid monohydrate, and sodium citrate dihydrate were purchased from Sigma-Aldrich (Milwaukee, Wisconsin). P-doped, single side polished (1 0 0) silicon wafers (University Wafer, South Boston, Massachusetts), with a thickness of 500 μm, were used as substrates 408 for profilometer thickness measurements and microscopy. Films for oxygen transmission testing were deposited on a 127 μm thick poly(ethylene terephthalate) (PET) film (ST505, Dupont-Teijin) purchased from Tekra (New Berlin, Wisconsin).

All aqueous solutions were prepared with 18.2 MΩ·cm deionized water. The pH of individual 20 wt % solutions of PEI and PAA were adjusted to 8.0 using 5 M HCl and NaOH, respectively. After achieving pH 8.0, the solutions were diluted to 10 wt % polymer and the pH was adjusted to 8.0 again. The PEC suspensions 506 were prepared by taking equal volumes of the two solutions and adding sodium chloride to achieve the desired concentration NaCl. PEI was added dropwise to the PAA while stirring vigorously. A solution pH of 8 was used because it reduced localized flocculation during mixing relative to lower pH processing. The suspensions were stirred for 10 min and then allowed to sit for approximately 1 hour. Coacervates and solutions were "annealed" in an oven for approximately 2 hours at approximately 70° C. prior to characterization.

A PEI/PAA coacervate, prepared using 1.0 M NaCl, was separated from the dilute phase by pipet. PET substrates 508 were corona treated immediately before coating. Silicon and PET substrates 508 were mounted on glass and coacervate fluid 506 was deposited using the Meyer rod 510. The Meyer rod 510 was approximately 0.5 inches in diameter, approximately 16 inches long and had an "equivalent wire diameter" of approximately 0.05 mm. The substrate 508 was then dipped in 100 mM citric acid/citrate buffer for 1 minute, followed by spraying with water to rinse and drying with a stream of filtered air. Humidity post-treatment involved placing the coated substrate 508 in a chamber with humidity varying from 93-97% relative humidity for approximately 12 hour. Thermal crosslinking was accomplished by placing the coated substrate 508 in an oven at approximately 150° C. for approximately 2 hour. All films were stored in a drybox for approximately 24 hours or more prior to characterization.

Figure 7:
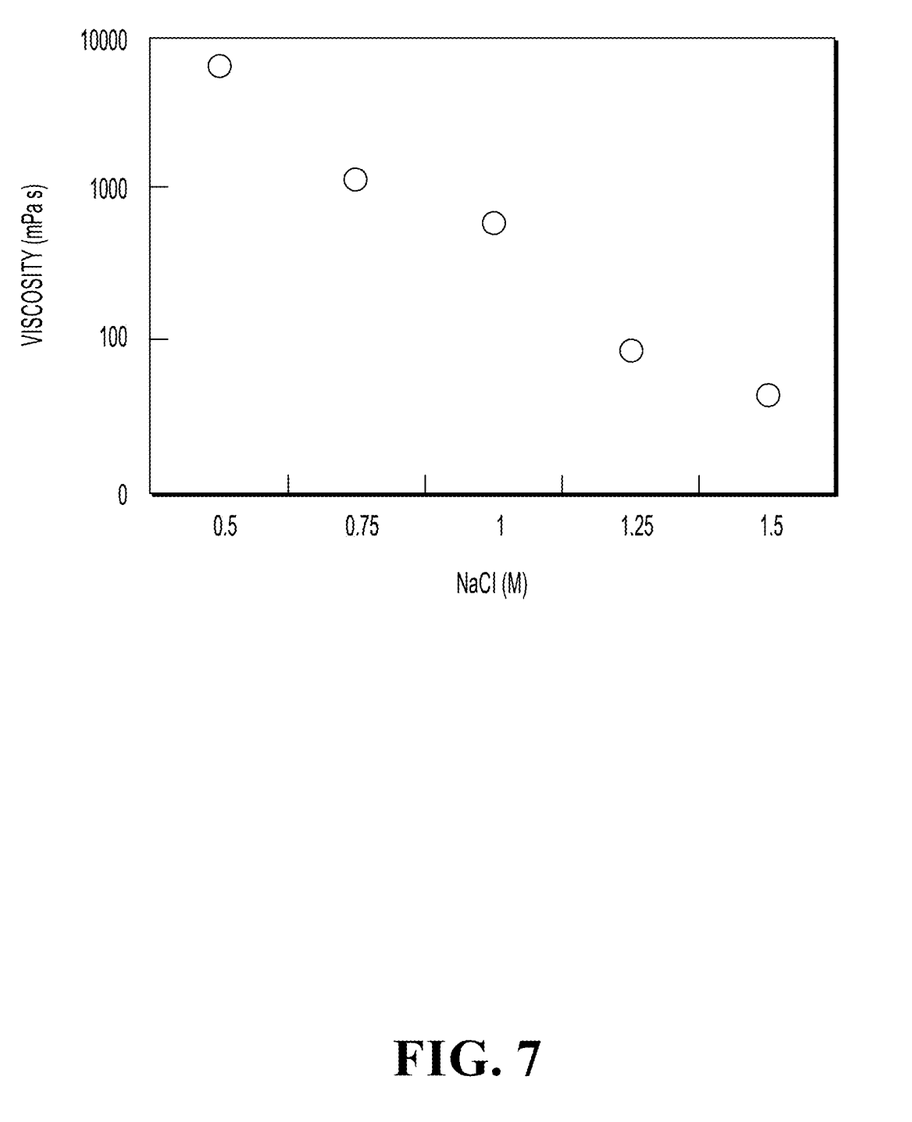
FIG. 7 is a graphical illustration of the viscosity of polyelectrolyte complex suspensions as a function of sodium chloride concentration, measured at a shear rate of 1 s$^{-1}$.
Figure 10:
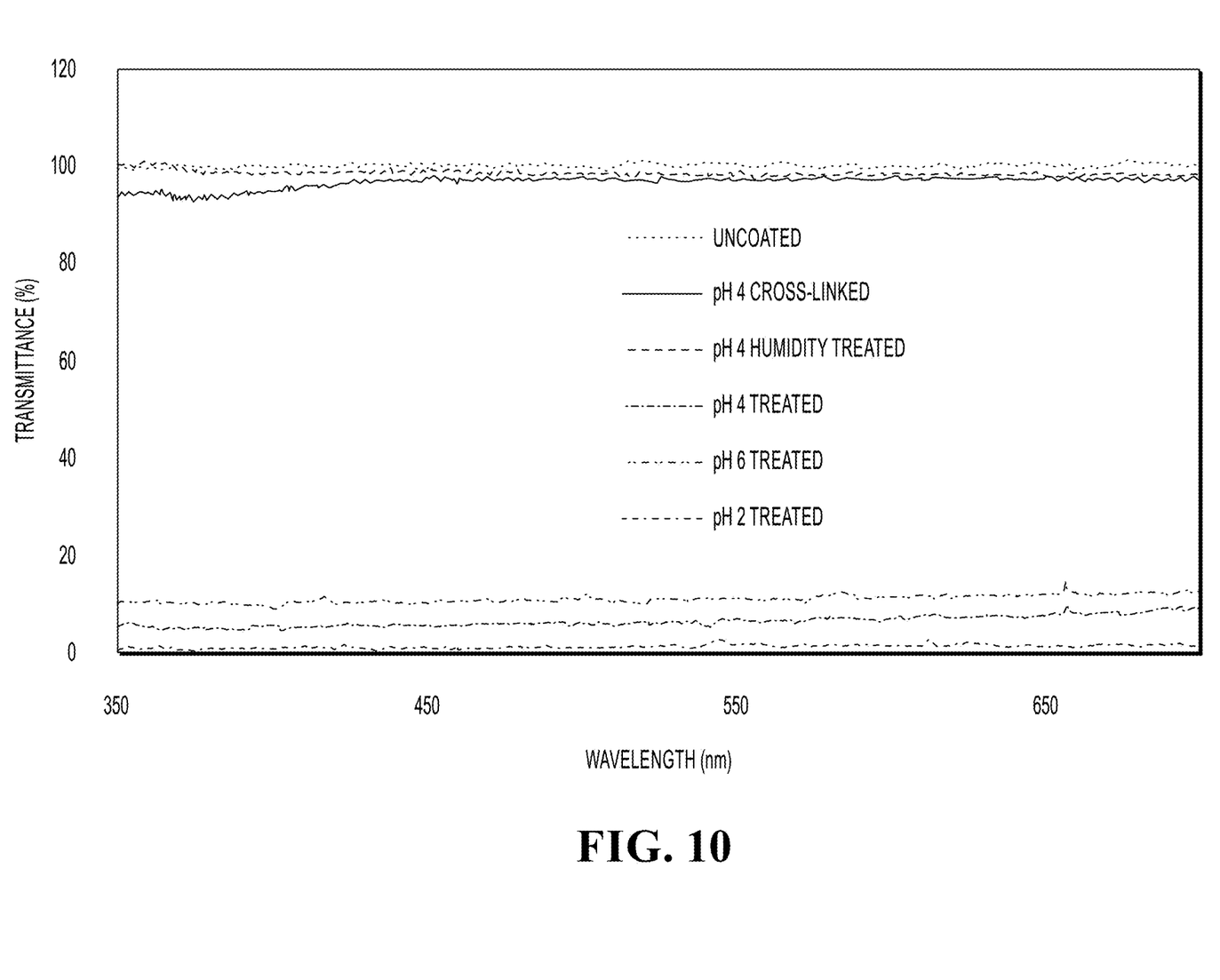
FIG. 10 is a graphical illustration of wavelength versus transmittance of film.

Film 512 thickness was measured on silicon wafers with, for example, a profilometer. Surface morphology was imaged using, for example, a JSM-7500F FESEM (JEOL, Tokyo, Japan). Prior to imaging, each film was sputter coated with approximately 5 nm of, for example, platinum/ palladium to reduce surface charging of the film. Atomic force microscopy was done using a Bruker Dimension Icon atomic force microscope ("AFM"). All mapping measurements were conducted using the tapping mode imaging of the AFM, under ambient conditions such as, for example, approximately 24° C. and approximately 45% relative humidity. Oxygen transmission rate measurements were performed by using, for example, an Oxtran 2/21 ML oxygen permeability instrument, in accordance with ASTM Standard D-3985, at approximately 23° C. and at approximately 50% relative humidity. Viscosity (TO) was measured using, for example, an AR G2 Rheometer (TA Instruments, New Castle, Delaware) using a 40 mm, 2° steel cone. Shear-stress experiments were performed at approximately 25° C. over a frequency range of approximately 1 1-100 Hz. Transmittance of PEC films 512 was measured using a USB2000 UV-Vis spectrometer (Ocean Optics, Dunedin, Florida). As illustrated in FIG. 7, viscosity decreases with higher salt concentration. FIG. 10 is a graphical illustration of transmittance versus wavelength for various pH films.

Figure 6B:
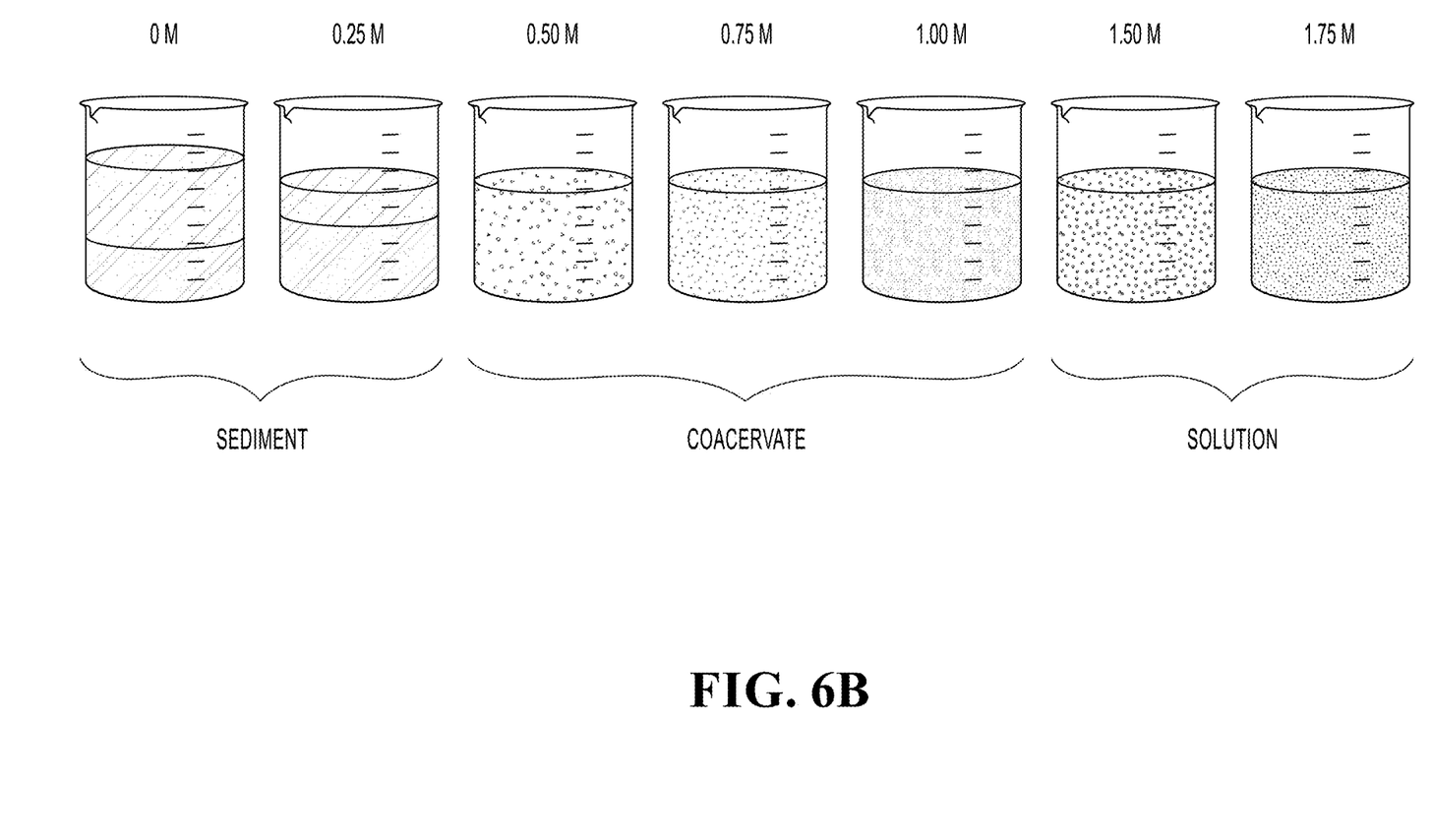
FIG. 6(b) is a photographic illustration of polyethylenimine and polyacrylic acid suspensions one hour after mixing at various concentrations of sodium chloride.

The effect of salt concentration on the complexation of the polyelectrolytes was studied by varying the concentration of sodium chloride in PEI and PAA solutions at, for example, 10 wt % polymer at pH 8.0, before mixing. In a range of 0 to approximately 0.25 M NaCl, PEI and PAA strongly associate into larger networks and form a macroscopic precipitate that is unsuitable for the Meyer rod 510 coating process. At concentrations of approximately 1.50 M and above, the ionic strength is high enough for PEI and PAA to be dissolved as individual chains, creating a true solution of polyelectrolytes. Coacervation is achieved at intermediate NaCl concentrations of, for example, approximately, 0.50-1.00 M, where phase separation of the polymer-rich coacervate layer and a polymer-poor dilute layer is observed. Samples of varying salt concentration 1 hour after mixing are shown in FIG. 6b. To further coalesce microphase droplets and better identify which suspensions phase separate, both the solutions and coacervates were "annealed" for approximately 2 hours at approximately 70° C., resulting in optically transparent phases. All coacervate phases were decanted for further characterization. All solutions have pH of approximately 8.0 and contain approximately 10% weight polymer with a 1:1 weight ratio of PEI to PAA.

Rheology was performed on the PEI/PAA solutions as well as the lower concentration salt coacervate phases to determine which PEC sample was suitable as the coating fluid for coating with the Meyer rod 510. FIG. 7 is a graphical illustration of the viscosity of coacervate phases at varying NaCl concentration. The free chain polyelectrolyte solutions (1.25-1.50 M) have viscosities much lower than those of the coacervates (0.50 M-1.0 M), where there is stronger interaction between polymer chains. The viscosities of the free chain polyelectrolyte solutions were considerably higher than water such as, for example, 1 mPa·s, indicating critical overlap concentration was achieved. To utilize the Meyer rod 510 for coating with minimal defects, the viscosity of the fluid should be high enough to resist secondary flows induced by dewetting and surface tension. The coacervate suspensions are suitable candidates for these coatings as they remain within the range of viscosity suitable for the Meyer rod 510 technique such as, for example, in the range of approximately 300-800 mPa·s. The complex coacervate with 1.0 M NaCl was used for the gas barrier film because its viscosity remained suitable over a wide range of shear rates such as, for example, 0.2-100.0 s$^{-1}$.

After separating from the top dilute phase of the polyelectrolyte complex, the coacervate prepared with 1.0 M NaCl was applied to substrates using the Meyer rod 510 illustrated in FIG. 5. The PEC film 512 was then dipped in water to extract sodium chloride, allowing the polyelectrolyte chains to more strongly associate and solidify the complex. Because the polyelectrolyte coacervate is above critical overlap concentration, the complex solidifies into a coherent film rather than individual colloidal particles. Subsequent spray rinsing appeared to erode the film 512 and there was noticeable undesirable stickiness, likely due to the incomplete ionization of PEI at pH 8 in the film. When PEI is not completely protonated, there are less ammonium groups to ionically bond with the carboxylate ions of PAA.

After rod coating, the films were immersed into citric acid/citrate buffer solutions at pH 6, 4, and 2 to fully protonate PEI, which improved its association with PAA. In addition to improving the film's durability to rinsing, acid buffer treatment produces higher cohesive energy density, which prevents gas molecules from moving aside polymer chains. Spray rinsing removed buffer, persistent salt and excess polymer and the films were finally dried by a stream of dry air. PEC films on silicon treated by pH 6 buffer were depleted in some areas and coatings treated at pH 2 could not remain adhered after spray rinsing. Using pH 4 buffer proved to be the most effective treatment and produced highly conformal films, with average thickness of approximately 1.63±0.09 μm.

Figure 8A:
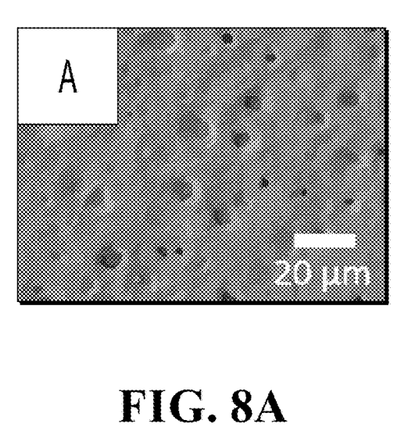
FIG. 8(a) is a scanning electron micrograph of a high oxygen barrier film before humidity treatment according to an exemplary embodiment.
Figure 8B:
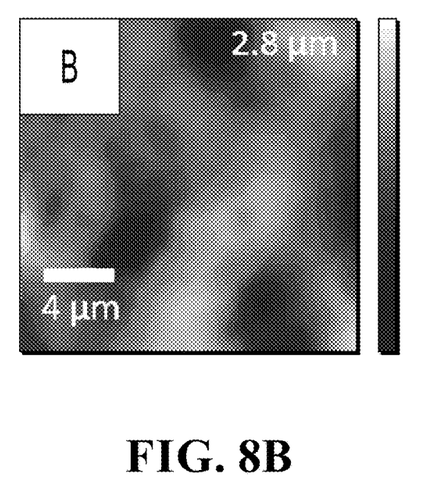
FIGS. 8(b) and 8(e) are both atomic force micrographs.
Figure 8C:
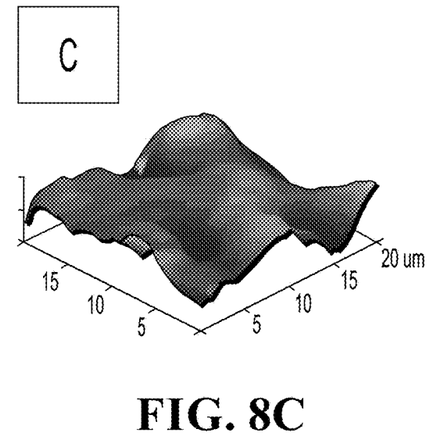
FIGS. 8(c) and 8(f) illustrate 3-dimensional topography maps for pH 4 treated polyethylenimine/polyacrylic acid coacervate deposited films before and after humidity post-treatment.
Figure 8D:
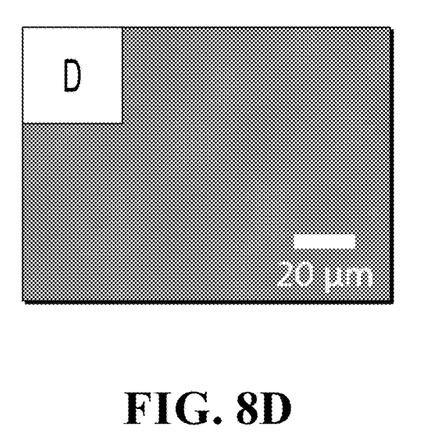
FIG. 8(d) is a scanning electron micrograph of a high oxygen barrier film after humidity treatment according to an exemplary embodiment.
Figure 8E:
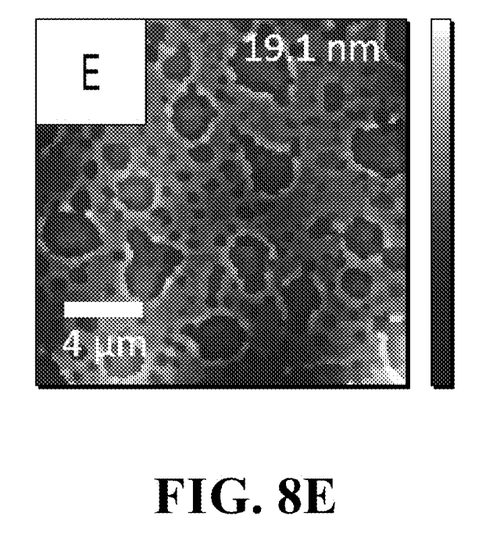
Figure 8F:
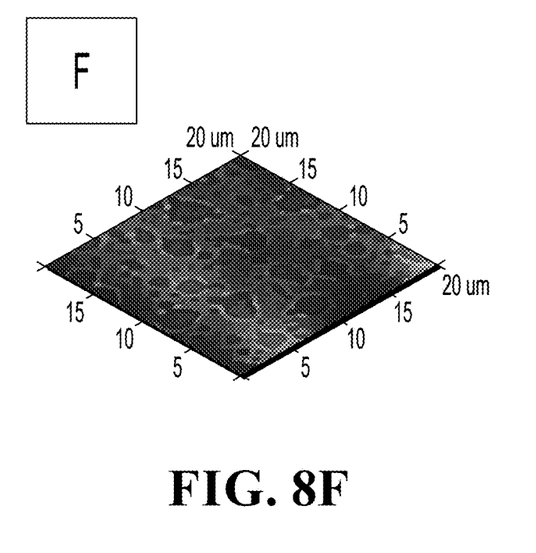
Figure 9:
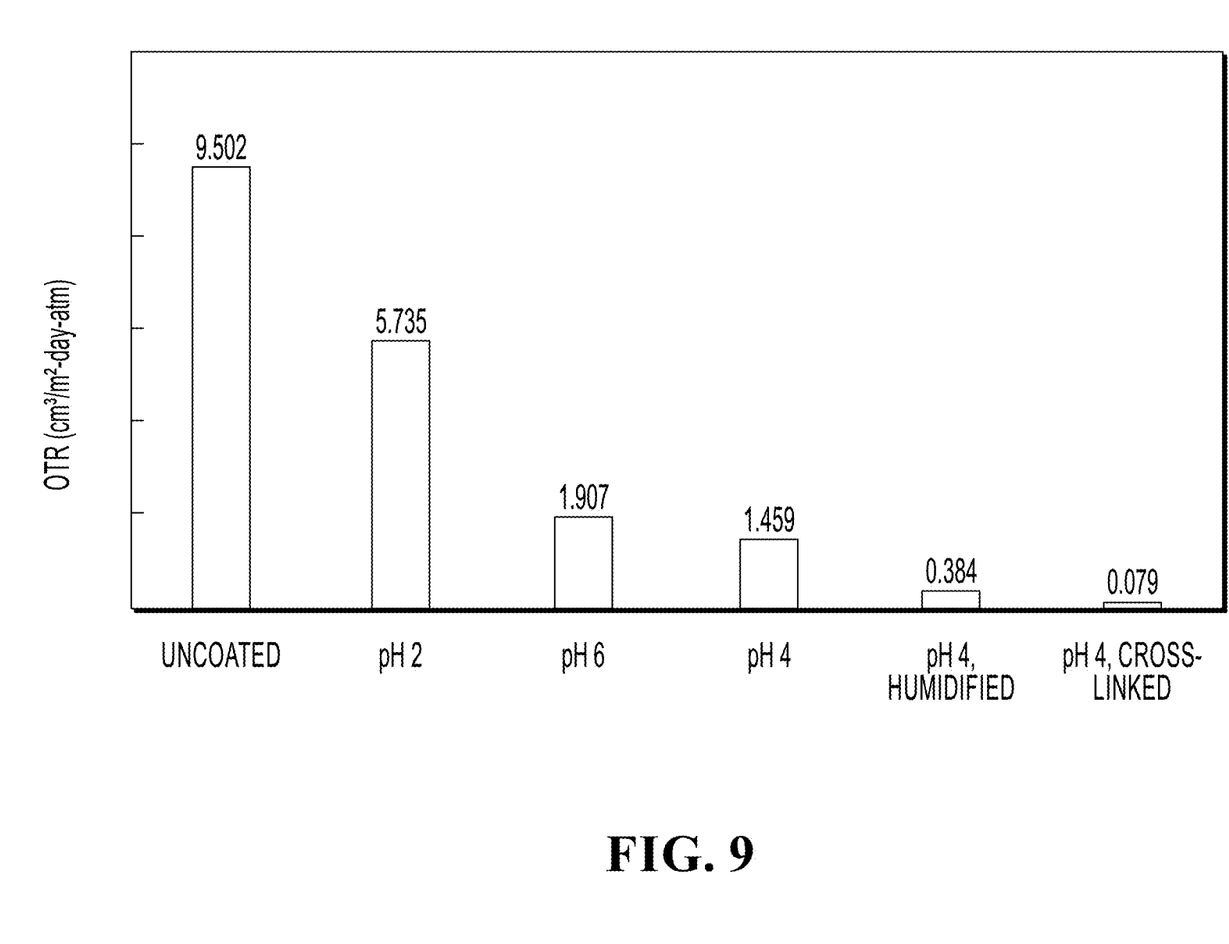
FIG. 9 is a graphical illustration of oxygen transmission rate versus pH.

As illustrated in FIG. 8a, scanning electron micrographs of pH 4 treated PEC films revealed a considerable amount of porosity (FIG. 8a). Atomic force microscopy (AFM) revealed pores spanning the thickness of the film, inhibiting the film's ability to reduce gas permeability. Pores likely arise from the fast evaporation of water from the film during air drying and are not present in films assembled layer-by-layer. To remove these pores, films were post-treated for approximately 12 hours in a 95% relative humidity chamber. Water acts as a plasticizer, allowing polymer to fill the coating's pores. As shown in FIGS. 8d-8f, both SEM and AFM of humidity-treated films 512 reveal very smooth coatings. Roughness of treated films 512 was reduced two orders of magnitude (from approximately 395 nm to approximately 2.60 nm and thickness increased to 1.91±0.08 μm.

Although unsuccessful on silicon, PEC films treated by a pH 2 and 6 buffer were successfully deposited on PET substrates 508 along with pH 4 treated films. pH 4 and pH 6 treatment resulted in hazy films, with visible light transmittance of approximately 14 and approximately 11%, respectively. Films 512 treated with pH 2 buffer were completely opaque having approximately 3% visible light transmittance. FIG. 10 shows that pH 4 treatment results in the best oxygen barrier on PET, reducing the oxygen transmission rate (OTR) of 0.127 mm thick PET from 9.51 to 1.46 cm$^3$/(m$^2$·day·atm). Humidity treatment of the PEC coating reduced the porosity of the film 512, marked by the substantial reduction of coating haziness (98% transparent), resulting in further reduction of OTR to 0.384 cm$^3$/(m$^2$·day·atm). An even further reduction in OTR resulted with thermal cross-linking of the humidified film 512, achieving an OTR of 0.08 cm$^3$/(m$^2$·day·atm). Thermal cross-linking chemically bonds the PEI to PAA to create amide bonds. Unlike an earlier study incorporating thermal cross-linking, no contraction was observed here, with the film maintaining a thickness of 1.99±0.06 μm.

The rod coating of polyelectrolyte coacervate suspensions provides a framework in which multi-polyelectrolyte films can be deposited in a single step. With this technique, it is likely that many multilayer gas barrier coatings can be more quickly and simply deposited. By affecting salt concentration, coacervates of sufficient viscosity can be formed to resist fluid flow and the film can be cured by using an appropriate pH buffer. Post-treatments of the film improved the oxygen barrier enormously and by combining humidity and cross-linking treatments, these PEC-based films provided PET with a two order of magnitude reduction in oxygen transmission rate, while also achieving optical transparency. This environmentally benign process offers the opportunity for scalable, less-costly barrier films.

Although various embodiments of the method and system of the present disclosure have been illustrated in the accompanying Drawings and described in the foregoing Specification, it will be understood that the disclosure is not limited to the embodiments disclosed, but is capable of numerous rearrangements, modifications, and substitutions without departing from the spirit and scope of the disclosure as set forth herein. For example, although the area 102 has been described herein as being an agricultural field, one skilled in the art will recognized that the area 102 could be any geographic area on which remote sensing could be performed. It is intended that the Specification and examples be considered as illustrative only.

What is claimed is:

1. A method of applying a gas-impermeable coating, the method comprising:
    forming a polyelectrolyte complex suspension;
    applying the polyelectrolyte complex suspension to a substrate, the polyelectrolyte complex suspension comprising a molar ratio of 1:3 of polycation to polyanion;
    treating the substrate having the polyelectrolyte complex applied thereon, wherein the treating reduces salt content of the polyelectrolyte complex and causes solid film formation on the substrate; and
    wherein, the treating results in a gas-impermeable coating being formed on the substrate.

2. The method of claim 1, wherein the polyelectrolyte complex comprises at least two oppositely charged polyelectrolytes.

3. The method of claim 2, wherein the polyelectrolyte complex comprises a cationic polyethylenimine (PEI) and anionic polyacrylic acid (PAA).

4. The method of claim 1, further comprising controlling pH of the polyelectrolyte complex such that polyelectrolytes dissolve or there is a reduction of at least one of hydrogen bonding or electrostatic interaction between the polyelectrolytes.

5. The method of claim 1, wherein the polyelectrolyte complex comprises at least one of a polycation, a polyanion, polyethylenimine, Poly(allyl amine), poly(diallyldimethyl ammonium chloride), chitosan, functionalized starch, poly (vinyl amine), poly(vinylbenzyltrimethyl-ammonium) bromide, poly(4-vinyl-N-butyl-pyridinium) chloride, poly (acrylic acid), sodium polyacrylate, poly(styrene sulfonic acid), sodium poly(styrene sulfonate), carboxymethylcellulose, alginic acid, hyaluronic acid, heparin, polyphosphoric acid, or polyphosphate salts.

6. The method of claim 1, further comprising controlling ionic strength to thereby make the polycation and the polyanion suitable for a Meyer rod coating process.

7. The method of claim 6, wherein the ionic strength is manipulated by addition of a salt.

8. The method of claim 1, wherein the applying comprises dip coating.

9. The method of claim 1, wherein the applying comprises utilizing a Meyer rod to apply the polyelectrolyte complex suspension to the substrate.

10. The method of claim 1, wherein the treating comprises a humidity treatment.

11. The method of claim 10, wherein the humidity treatment removes porosity and uncovers fissures.

12. The method of claim 10, wherein the humidity treatment is conducted at greater than 95% relative humidity.

13. The method of claim 1, wherein the treating comprises addition of a cross-linking agent.

14. The method of claim 13, wherein method further comprises crosslinking chemical bonds of polyethylenimine and polyacrylic acid to create amide bonds.

15. The method of claim 14, wherein the crosslinking comprises thermal crosslinking performed by high heat at 150° C. for 2 hours.

16. The method of claim 1, wherein the treating comprises utilizing a buffer to improve durability to rinsing of the solid film formation and produce higher cohesive energy density.

17. The method of claim 16, wherein the buffer comprises a citric acid or a citrate buffer aqueous solution.

18. The method of claim 1, wherein the solid film formation is less than 10 microns.

19. The method of claim 1, wherein the solid film formation has an oxygen transmission rate of less than 10 $cm^3/(m^2 \cdot day \cdot atm)$.

* * * * *